E. W. BASCOM.
CONVEYER SUPPORT.
APPLICATION FILED MAR. 14, 1918.
1,335,270.
Patented Mar. 30, 1920.
2 SHEETS—SHEET 2.
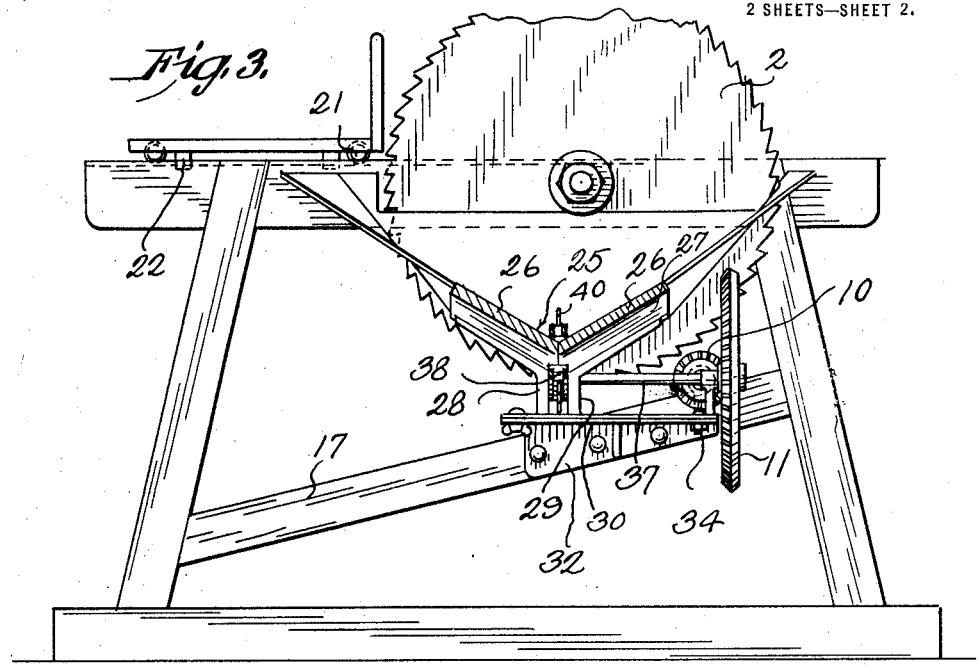
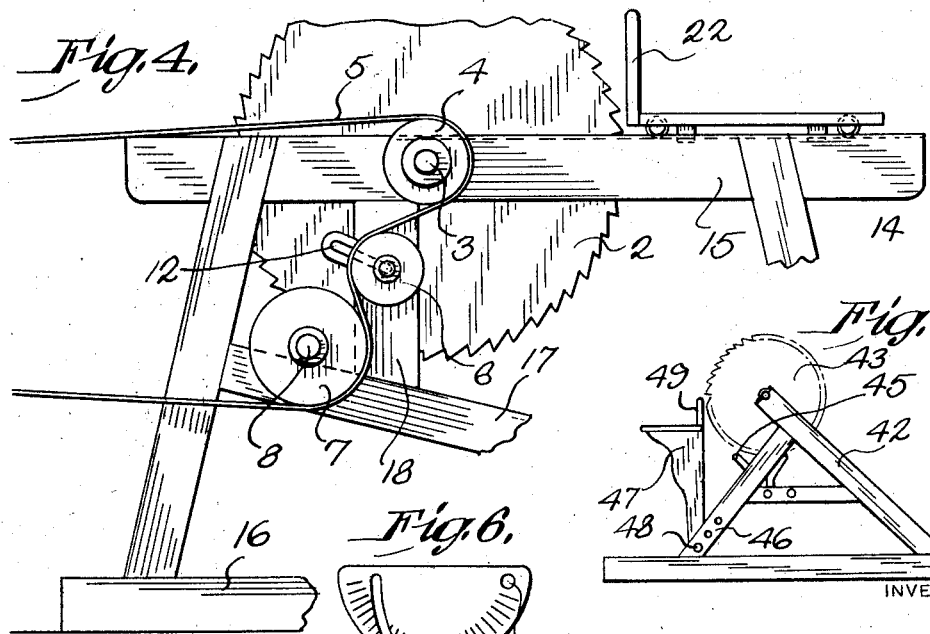
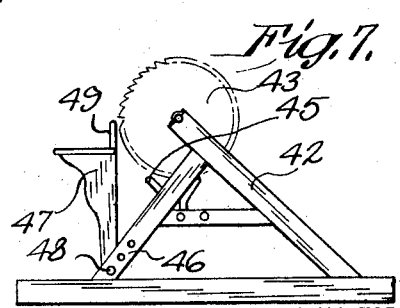
WITNESSES
R. W. Hoagland
Irving S. W. Cathman
INVENTOR
Eric W. Bascom,
BY Richard Owen.
ATTORNEY

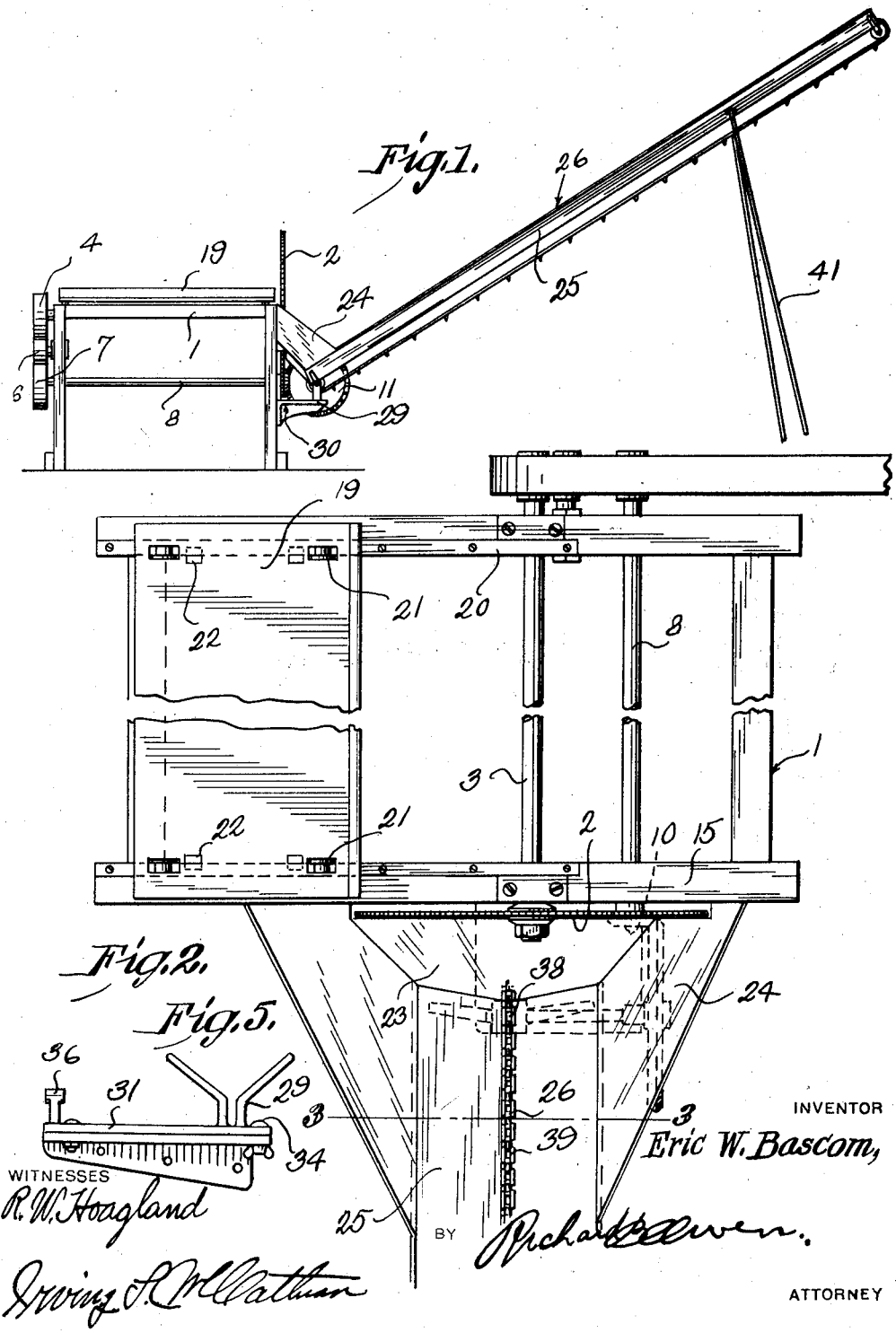

UNITED STATES PATENT OFFICE.

ERIC W. BASCOM, OF HOUGHTON, NEW YORK.

CONVEYER-SUPPORT.

1,335,270.  Specification of Letters Patent.  Patented Mar. 30, 1920.

Application filed March 14, 1918. Serial No. 222,429.

*To all whom it may concern:*

Be it known that I, ERIC W. BASCOM, a citizen of the United States, residing at Houghton, in the county of Allegany and State of New York, have invented certain new and useful Improvements in Conveyer-Supports, of which the following is a specification.

This invention relates to conveyers for use with wood sawing machine in such a manner as to permit the sawed portions of the wood to be easily and conveniently conveyed to a point of deposit, such as a wood pile or a conveyance for carrying the sawed wood to its proper destination.

Another object of the invention is the production of a simple and efficient means for facilitating the attachment of the lower end of the conveyer in close proximity to the saw and also permitting the conveyer to be changed to a desired angle with respect to the saw supporting frame.

With these and other objects in view the invention consists in certain novel constructions, combinations and arrangements of parts as will be hereinafter fully described and claimed.

In the drawings:—

Figure 1 is a side elevation of a sawing machine,

Fig. 2 is a top plan view thereof, certain parts being broken away,

Fig. 3 is a section taken on line 3—3 of Fig. 2,

Fig. 4 is a side elevation of the sawing frame, showing the driving means for the rotary saw, Fig. 5 is a side elevation of the beams for supporting the inner end of the conveying trough, Fig. 6 is a top plan view of the supporting bracket for the inner end of the conveying trough, and Fig. 7 is a side elevation of a modified form of the sawing machine used in connection with the present invention.

By referring to the drawings it will be seen that 1 designates a frame of the sawing device which may be made of any suitable or desired design without departing from the spirit of the invention. A rotary saw 2 is supported upon the frame 1 and is driven by means of an operating shaft 3, this operating shaft 3 carrying a driving pulley 4 at the outer end thereof. The driving pulley 4 carries a driving belt 5, this driving belt 5 passing over a belt tightening or idle wheel 6 and also passing over an auxiliary pulley 7. This auxiliary pulley 7 is carried by a shaft 8, which shaft is supported upon the frame 1 as shown in Fig. 4 and extends transversely across the frame and carries a bevel gear 10 at its outer end, with which bevel gear 10 meshes an enlarged bevel gear 11 for the purpose of driving the conveyer chain as will be hereinafter fully described. The belt tightening wheel 6 is adjustably mounted upon a slotted bracket 12 as shown in Fig. 4 and it should be understood that this belt tightening pulley 6 may be adjusted in any suitable or desired manner for the purpose of keeping the belt 5 in a taut relation.

As shown in Figs. 3 and 4 the frame 1 comprises a plurality of vertically extended supporting standards 14, which standards carry the upper rails 15 at their upper ends. The lower ends of the standards 14 being supported upon the parallel base rails 16. Upwardly inclined braces 17 are secured to the sides of the frame and interposed between the vertically extending standards 14, this inclined brace 17 constituting a support for the transversely extending conveyer driving shaft 8. The belt tightening wheel or pulley 6 supported upon a vertically extending bracing bar 18 as shown in Fig. 4. The upper parallel rails 15 constitute a track for the work carrying carriage 19 and these rails 15 are provided with track plates 20 formed upon the upper face thereof. The carriage 19 is provided with a plurality of supporting rollers 21, which rollers travel upon the track plates 20 for the purpose of guiding the carriage 19 in its movements for moving the log which is to be cut, toward the saw 2. This carriage 19 is provided with an abutment wall 22 upon the inner edge thereof against which the log or piece of wood to be sawed is adapted to be rested while the same is being fed in engagement with the saw 2. The carriage 19 is provided with a plurality of lugs 22 upon the bottom thereof, which lugs 22 bear against the inner faces of the rails 15 and prevent the lateral displacement of the carriage 19 while the same is being moved longitudinally upon the rails 15.

The frame 1 is provided with an inclined chute board 23 and a pair side inclined chute boards 24, these chute boards coöperating with the conveyer trough 25 for the purpose of delivering the cut material to the conveyer chain 26.

The conveyer trough 25 comprises a pair of parallel outwardly diverging boards 26, having their abutting ends arranged on a lower plane than their upper outer edges. These side boards 26 of the trough 25 are braced by means of the bracing feet 27 and these feet 27 are engaged by means of the suitable supporting fingers 28 of the bracket 29. This bracket 29 is supported upon a supporting plate 30, which supporting plate 30 is secured in any suitable or desired manner to the inclined bracing bars 17 as shown in Fig. 3. The bracket 29 is provided with a broad space 31 which rests upon the upper face of the plate 30 and this plate 30 is provided with a depending flange portion 32 the flange portion 32 being fitted flat against the brace 17 as shown in Fig. 3. The plate 30 is provided with an arched slot 33 within which arched slot 33 fits a securing bolt 34 for firmly holding the bracket 29 in an adjusted position upon the plate 30. The bracket 29 is also securely held in engagement with the plate 30 by means of a suitable bolt 34 which bolt 34 also passes through an enlarged aperture 35, this bolt 34 constituting a pivot for permitting the lower end or inner end of the conveyer trough 25 to be adjusted at a desired angle relative to the frame 1. It of course should be understood that the abutting faces of the bracket 29 and the plate 30 may be roughened if so desired for the purpose of facilitating the holding of the bracket 29 in an adjusted position upon the supporting plate 30. The base 31 of the bracket 29 is provided with an upwardly extending journal portion 36, through which journal portion 36 extends the shaft 37 which supports the enlarged gear wheel 11. This shaft 37 also carries a sprocket wheel 38, over which sprocket wheel 38 passes a conveyer chain 39 having suitable spurs or projecting fingers 40 for the purpose of permitting the wood which has been sawed by the saw 2 to follow longitudinally of the conveyer trough 25.

The conveyer trough 25 is supported near its outer end by means of the bracing standard 41, which bracing standard may be secured in any suitable or desired manner to the under face of the conveyer trough 25.

By considering Figs. 5 and 6 it will be seen that the inner end of the conveyer trough 25 will be readily adjusted to suit the desired position of the conveyer trough and permitting the inner end of the conveyer trough to be arranged at a desired angle with respect to the frame 1 for the purpose of receiving and conveying the cut boards to a desired point of discharge. It of course should be understood that the chain 39 passes over a suitable guiding sprocket wheel carried by the outer end of the conveyer trough 25 as shown in Fig. 1.

In Fig. 7 there is shown a modified form of the invention wherein the frame 42 is employed having a saw 43 carried by the upper end thereof, the saw being driven in any suitable or desired manner. A conveyer trough 45 is supported at its inner end in engagement with the frame 42 and this frame 42 is provided with an upwardly inclined brace member 46 to which bracing member 46 is adjustably connected a swinging work supporting frame 47. Suitable apertures 48 are formed in the inclined brace 46 for the purpose of permitting the lower end of the frame 47 to be adjustably secured thereto. The work supporting frame 47 is provided with an upwardly extending wall 49 against which the work, such as a log of wood or other piece of material which it is desired to cut, is adapted to rest. It of course should be understood that the frame 47 may be easily swung toward the saw body frame for the purpose of cutting the material carried thereby.

From the foregoing description it will be seen that a very simple and efficient means has been produced for the purpose of cutting or sawing slab wood, timber and the like and automatically conveying the same to a vehicle or to a suitable pile, in this way carrying the cut pieces of material away from the saw and permitting the saw to easily operate without becoming jammed.

It should be understood of course that any suitable or desired form of conveyer chain may be used in connection with the present invention, such for instance as the usual double chain which is connected by means of transversely extending conveying bars. It is thought unnecessary to illustrate a chain of this character in view of the fact that chains of this design are used upon various conveying devices.

What is claimed:—

A trough of the class described comprising a support, said trough extending upwardly relative to said support, inclined chute plates carried by said trough, a substantially V-shaped bracket fitting under said trough and constituting an efficient support and reinforcement therefor, a plate supporting said bracket, means for pivotally connecting said bracket to said plate, said plate provided with an arc-shaped slot formed therein, and a binding screw carried by said bracket and passing through said slot for locking said bracket in an adjusted position upon said plate.

In testimony whereof I affix my signature in presence of two witnesses.

ERIC W. BASCOM.

Witnesses:
W. W. STUGART,
WM. CALKINS.